(12) United States Patent
Aoba

(10) Patent No.: US 10,395,136 B2
(45) Date of Patent: Aug. 27, 2019

(54) IMAGE PROCESSING APPARATUS, IMAGE PROCESSING METHOD, AND RECORDING MEDIUM

(71) Applicant: CANON KABUSHIKI KAISHA, Tokyo (JP)

(72) Inventor: Masato Aoba, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 405 days.

(21) Appl. No.: 14/849,346

(22) Filed: Sep. 9, 2015

(65) Prior Publication Data

US 2016/0070976 A1 Mar. 10, 2016

(30) Foreign Application Priority Data

Sep. 10, 2014 (JP) ................................. 2014-184563

(51) Int. Cl.
*G06K 9/00* (2006.01)
*G06K 9/46* (2006.01)
*G06K 9/34* (2006.01)
*G06K 9/62* (2006.01)

(52) U.S. Cl.
CPC ....... *G06K 9/4671* (2013.01); *G06K 9/00664* (2013.01); *G06K 9/342* (2013.01); *G06K 9/6262* (2013.01)

(58) Field of Classification Search
CPC .............................................. G06K 9/00–9/82
See application file for complete search history.

(56) References Cited

U.S. PATENT DOCUMENTS

| 8,478,052 B1* | 7/2013 | Yee | G06K 9/4676 |
| | | | 382/155 |
| 9,684,959 B2* | 6/2017 | Cheng | G06T 7/0012 |
| 2003/0110038 A1* | 6/2003 | Sharma | G06K 9/00221 |
| | | | 704/270 |
| 2004/0202368 A1* | 10/2004 | Lee | G06K 9/00624 |
| | | | 382/173 |
| 2005/0071300 A1* | 3/2005 | Bartlett | G06K 9/6215 |
| | | | 706/12 |

(Continued)

FOREIGN PATENT DOCUMENTS

JP 4942510 B2 5/2012

OTHER PUBLICATIONS

Pedro F. Felzenszwalb et al., "Efficient Graph-Based Image Segmentation", IJCV, 2004, 26 pages.

(Continued)

*Primary Examiner* — Sean T Motsinger
(74) *Attorney, Agent, or Firm* — Canon USA, Inc., IP Division

(57) ABSTRACT

An image processing apparatus includes a first learning unit configured to learn an identifier for identifying a class of a region formed by segmenting an image based on first training data, an evaluation unit configured to evaluate a result of identification of a class of the first training data by the identifier, a generation unit configured to generate second training data from the first training data based on an evaluation result by the evaluation unit, and a second learning unit configured to learn a plurality of identifiers different from the identifier learned by the first learning unit based on the second training data.

17 Claims, 12 Drawing Sheets

(56) References Cited

U.S. PATENT DOCUMENTS

| | | | | |
|---|---|---|---|---|
| 2005/0213810 A1* | 9/2005 | Sabe | G06K 9/00248 | 382/159 |
| 2006/0050960 A1* | 3/2006 | Tu | G06K 9/6256 | 382/173 |
| 2007/0133857 A1* | 6/2007 | Wang | G06K 9/00147 | 382/133 |
| 2009/0287620 A1* | 11/2009 | Xu | G06K 9/00248 | 706/12 |
| 2010/0232686 A1* | 9/2010 | Dewan | G06K 9/6209 | 382/159 |
| 2010/0310158 A1* | 12/2010 | Fu | G06K 9/00362 | 382/159 |
| 2010/0329529 A1* | 12/2010 | Feldman | G06K 9/6252 | 382/131 |
| 2011/0188737 A1* | 8/2011 | Prokhorov | G06K 9/00 | 382/154 |
| 2011/0229025 A1* | 9/2011 | Zhao | G06K 9/4671 | 382/165 |
| 2013/0094701 A1* | 4/2013 | Huang | G06K 9/6267 | 382/103 |
| 2013/0259372 A1* | 10/2013 | Xu | G06K 9/00624 | 382/170 |
| 2014/0233826 A1* | 8/2014 | Agaian | A61B 5/7267 | 382/133 |
| 2015/0161439 A1* | 6/2015 | Krumm | G06K 9/00624 | 382/113 |
| 2015/0187070 A1* | 7/2015 | Cheng | G06T 7/11 | 382/128 |
| 2015/0243049 A1* | 8/2015 | Li | G06K 9/00355 | 382/165 |
| 2016/0070976 A1* | 3/2016 | Aoba | G06K 9/4671 | 382/180 |
| 2016/0140436 A1* | 5/2016 | Yin | G06N 3/08 | 706/20 |
| 2016/0155024 A1* | 6/2016 | Partis | G06T 7/11 | 382/173 |
| 2017/0286806 A1* | 10/2017 | Kim | G06K 9/6262 | |

OTHER PUBLICATIONS

Radhakrishna Achanta et al., "SLIC Superpixels", School of Computer and Communication Sciences, EPFL Technical Report, 2010, 15 pages.

* cited by examiner

IMAGE PROCESSING APPARATUS, IMAGE PROCESSING METHOD, AND RECORDING MEDIUM

BACKGROUND OF THE INVENTION

Field of the Invention

The present disclosure generally relates to image processing and, more particularly, to an image processing apparatus, an image processing method, and a recording medium.

Description of the Related Art

Many studies for segmenting an image into a plurality of regions have conventionally been made, and especially in recent years, studies for cutting out semantic regions, such as a human region, a car region, a road region, a building region, and a sky region, from an image have been actively researched. Such an issue is called semantic segmentation, which is considered to be applicable to image correction and scene interpretation adaptive to the types of objects in the image. In semantic segmentation, it has already become commonplace to identify class labels relating to positions of an image not in units of pixels but in units of superpixels. Superpixels are cut out from an image mostly as small regions having similar features. There have been discussed various techniques for cutting out superpixels.

Representative examples include a graph-based technique discussed in non-patent literature 1 ("Efficient Graph-Based Image Segmentation", P. F. Felzenszwalb, International Journal of Computer Vision (IJCV), 2004) and a clustering-based technique discussed in non-patent literature 2 ("SLIC Superpixels", R. Achanta, A. Shaji, K. Smith, A. Lucchi, EPFL Technical Report, 2010). Superpixels thus obtained are subjected to the identification of class labels by using feature amounts inside the superpixels. Context feature amounts nearby may be used as well. Various training images are usually used to train such local-based region identifiers for identifying regions.

When identifying a region class on an image by using a region identifier, superpixels of the same class category may have different image features depending on the imaging situation. For example, a cloud may be captured in white during the daytime while the same cloud, if captured with the setting sun, can be in orange due to the reflection of the sun light. In such a case, the orange cloud in the sunset image and a textureful orange wall captured during the daytime are similar on a feature space. If the sunset image and the image of the orange wall are both learned by the region identifiers by using various training images as described above, it is difficult to distinguish these images.

Japanese Patent No. 4,942,510 discusses a technique for recognizing a vehicle adaptively to vehicle angles and weather variations by subdividing the problem. According to the technique, support vector machines (SVMs) corresponding to respective conditions are prepared depending on the numbers of horizontal lines and vertical lines in an object region and contrast. Vehicle recognition is performed by switching the SVMs according to the condition. In such an example, the recognition problems are simplified by switching the problems at predetermined thresholds of the foregoing condition.

The method discussed in Japanese Patent No. 4,942,510 is based on a concept called divide and rule, which includes dividing a problem based on a change in a situation and switching solutions. However, when dividing a problem based on conditions, it is not necessarily the best approach for a human to deliberately determine the condition. For example, in the case of distinguishing a daytime scene and an evening scene, the boundary between the daytime and evening is obscure and not clearly definable. Other than the daytime and evening, there may also be other situations in which problems can be divided for simplification, but such situations are difficult to know in advance.

SUMMARY OF THE INVENTION

The present disclosure is directed to a technique for accurately identifying an image even if an image feature varies due to a change in an imaging condition.

According to an aspect of the present disclosure, an image processing apparatus includes a first learning unit configured to learn an identifier for identifying a class of a region formed by segmenting an image based on first training data, an evaluation unit configured to evaluate a result of identification of a class of the first training data by the identifier, a generation unit configured to generate second training data from the first training data based on an evaluation result by the evaluation unit, and a second learning unit configured to learn a plurality of identifiers different from the identifier learned by the first learning unit based on the second training data.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings.

Figure 1:
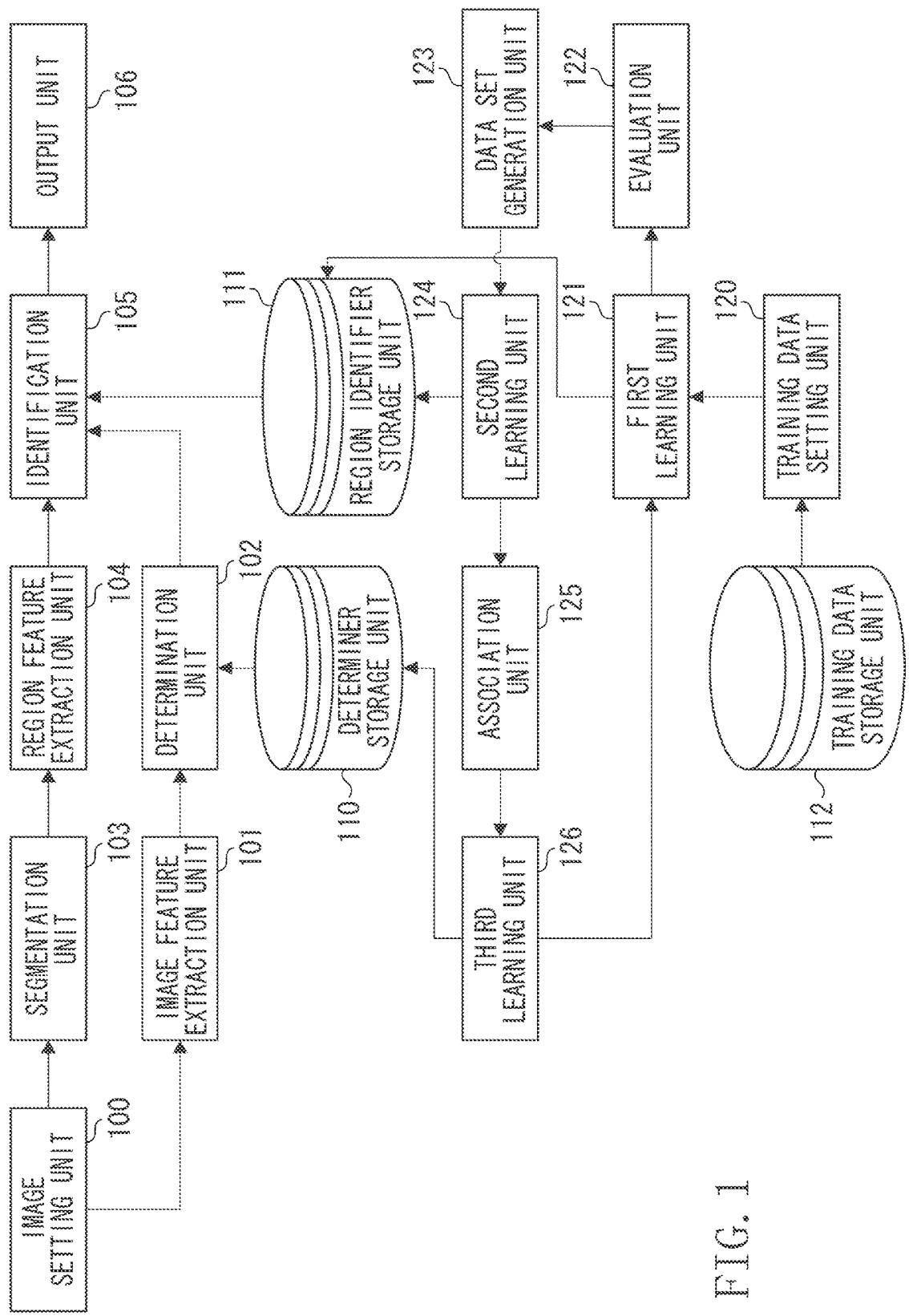
FIG. 1 is a block diagram illustrating a software configuration of an image processing apparatus according to a first exemplary embodiment.

FIG. 1 is a block diagram illustrating a software configuration of an image processing apparatus according to a first exemplary embodiment. The image processing apparatus performs image identification processing and learning processing. Herein, the image identification processing refers to processing for segmenting an input image into sematic regions (region classes) such as a sky, a body, and a building. The learning processing refers to processing for generating a region identifier to be used in the image identification processing by using a training image. In the present exemplary embodiment, the image processing apparatus generates a plurality of region identifiers. The image processing apparatus further generates a determiner for determining a suitability degree of each region identifier with respect to the input image in the image identification processing.

First, a configuration relating to the image identification processing will be described. An image setting unit 100 sets an input image to be subjected to the image identification processing. An image feature extraction unit 101 extracts a global image feature of the entire input image. A determination unit 102 selects a region identifier suitable for processing the input image by using a determiner previously stored in a determiner storage unit 110. A segmentation unit 103 segments the input image into a plurality of superpixels. Herein, superpixels refer to small regions that are cut out from an image as mostly having similar features. Typical processing techniques for segmenting an image into superpixels include the graph-based technique discussed in non-patent literature 1 entitled "Efficient Graph-Based Image Segmentation", P. F. Felzenszwalb, IJCV, 2004, and the clustering-based technique discussed in non-patent literature 2 entitled "SLIC Superpixels", R. Achanta, A. Shaji, K. Smith, A. Lucchi, EPFL Technical Report, 2010. The processing for segmenting an image into superpixels is not particularly limited. A region feature extraction unit 104 extracts region features from the superpixels. An identification unit 105 identifies regions of the input image. More specifically, the identification unit 105 reads the region identifier selected by the determination unit 102 from the region identifier storage unit 111, and estimates the region classes of the respective superpixels by using region feature amounts extracted by the region feature extraction unit 104. The region classes of the superpixels obtained by the identification unit 105 are output by an output unit 106. The region identifier storage unit 111 stores a plurality of region identifiers generated by the learning processing to be described below. The determiner storage unit 110 stores a plurality of determiners generated to correspond to the region identifiers generated in the learning processing. As used herein, the term "unit" generally refers to any combination of software, firmware, hardware, or other component, such as circuitry, that is used to effectuate a purpose.

Next, a configuration relating to the learning processing will be described. A training data storage unit 112 stores previously prepared images for training (training images) and region teacher data. Training data includes a plurality of training images and region teacher data. A training data setting unit 120 reads the training data from the training data storage unit 112, segments each training image into superpixels, and extracts region features serving as feature amounts of the superpixels and an image feature serving as a feature of the entire image. A first learning unit 121 performs learning processing based on the region features and region labels of the superpixels in all the supplied training images, generates region identifiers, and stores the generated region identifiers into the region identifier storage unit 111.

An evaluation unit 122 performs region identification on all the supplied training images by using the region identifiers generated by the first learning unit 121. The evaluation unit 122 then compares the result of the region identification with the region teacher data to make an evaluation. A data set generation unit 123 generates new training images (training data sets) from the supplied training images based on the evaluation result by the evaluation unit 122. A second learning unit 124 performs learning processing by using each training data set generated by the data set generation unit 123 to generate region identifiers, and stores the generated region identifiers into the region identifier storage unit 111.

An association unit 125 performs region identification on all the training images by using the region identifiers obtained by the first learning unit 121 and the second learning unit 124. The association unit 125 then compares the identification result with the region teacher data, and associates each training image with a category of a determiner based on the comparison result. A third learning unit 126 learns a determiner to output suitability degrees of the region identifiers based on the associated training images. The third learning unit 126 stores the determiner obtained by the learning into the determiner storage unit 110. The third learning unit 126 removes the training images associated with any of the categories by the association unit 125 from the training data. The remaining training images are processed by the first learning unit 121 again as training data.

Figure 2:
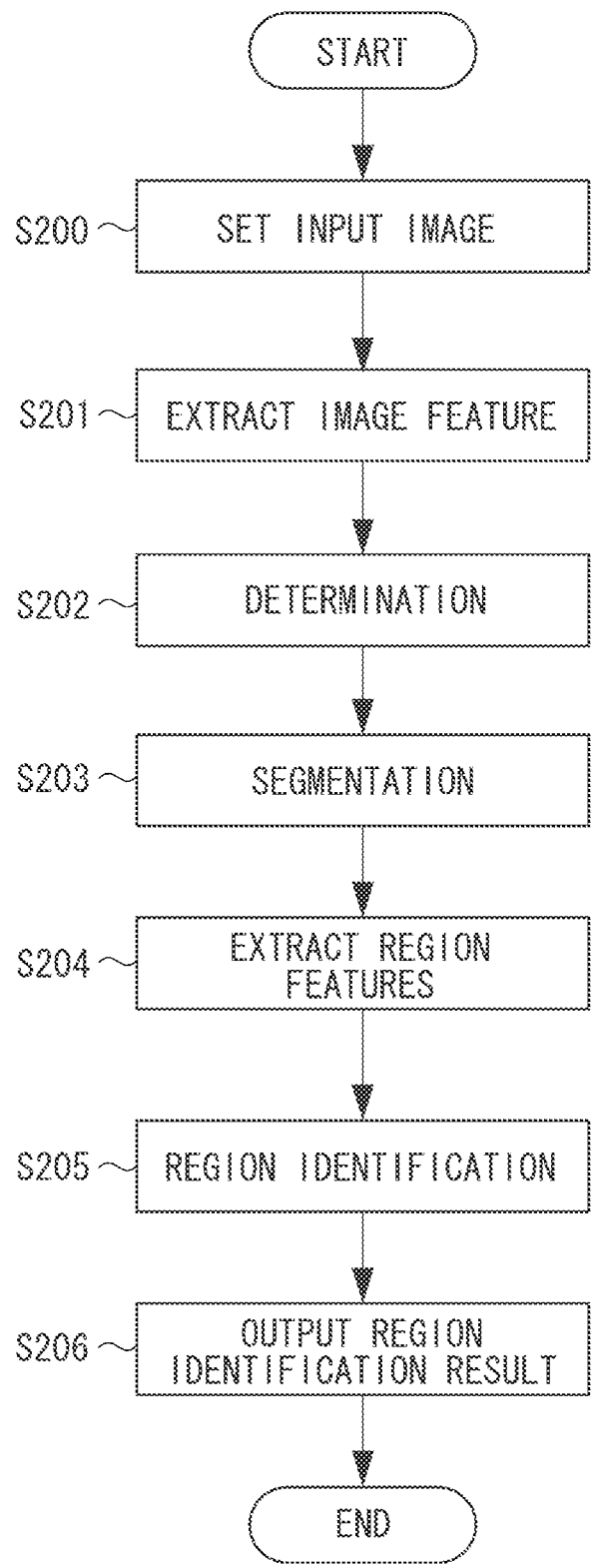
FIG. 2 is a flowchart illustrating image identification processing.
Figure 3:
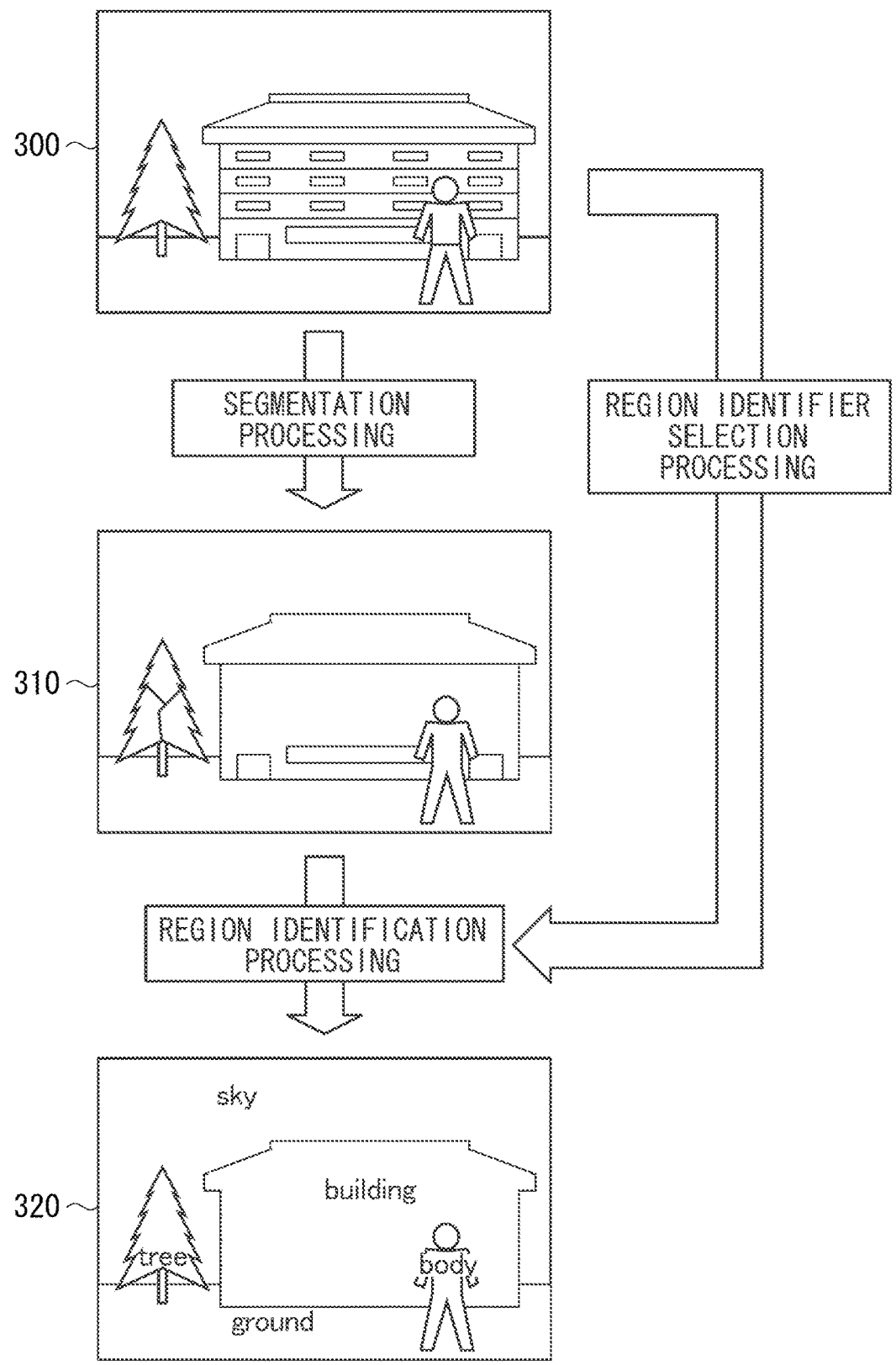
FIG. 3 is a diagram illustrating the image identification processing.

FIG. 2 is a flowchart illustrating the image identification processing by the image processing apparatus. In step S200, the image setting unit 100 sets an input image to be processed. The input image to be processed may be an image supplied from an imaging apparatus such as a camera, or an image stored in advance in a storage such as a hard disk of the image processing apparatus. The method for obtaining the input image is thus not limited in particular. FIG. 3 illustrates an example of an input image 300.

In step S201, the image feature extraction unit 101 extracts an image feature of the entire input image from the input image. Examples of the image feature may include a bag of words (BoW) feature based on a color histogram of the entire input image or a histogram of gradient vector directions, and a Fischer vector. The types of the image feature are not limited to those of the present exemplary embodiment. Here, the image feature obtained from an input image I will be denoted by F.

In step S202, the determination unit 102 selects a region identifier suitable for the segmentation of the input image I based on the image feature F. More specifically, first, the determination unit 102 reads a determiner g previously obtained through the learning processing to be described below from the determiner storage unit 110. With the image feature F being an input, the determiner g outputs a suitability degree vector $g(F)$ of each region identifier. The suitability degree vector $g(F)$ is an $N_s$-dimensional vector with respect to a total of $N_s$ region identifiers. The elements of the suitability degree vector $g(F)$ are the suitability degrees with respect to the respective region identifiers. The suitability degree vector $g(F)$ is given by (Eq. 1):

$$g(F)=[g_1(F) \ldots g_s(F) \ldots g_{N_s}(F)] \quad \text{(Eq. 1)}$$

Here, $g_s(F)$ ($s=1, \ldots, N_s$) is the suitability degree with respect to an s-th region identifier. $N_s$ is the total number of region identifiers, which is determined by the learning processing to be described below. The result of determination is obtained as an index $s(I)$ of a region identifier that maximizes the suitability degree $g_s(F)$, as expressed by (Eq. 2):

$$s(I) = \arg\max_s g_s(F) \quad \text{(Eq. 2)}$$

In other words, the determination unit 102 selects the region identifier identified by the index $s(I)$ as a region identifier suitable for the segmentation of the input image I. The processing of step S202 is an example of selection processing for selecting an identifier to be used for the processing of an input image from among a plurality of region identifiers based on a suitability degree output from a determiner.

In step S203, the segmentation unit 103 segments the input image I into superpixels. Suppose that the number of superpixels obtained by segmenting the input image I is K. FIG. 3 illustrates an example of a result 310 of superpixel segmentation obtained with respect to the input image 300. In step S204, the region feature extraction unit 104 extracts region features for identifying the region classes of the respective superpixels. Examples of the region features include an average color value and a color histogram in a superpixel, a position and size of a superpixel, and a texture feature such as local binary patterns (LBP). The types of the region features are not particularly limited. The region feature extraction unit 104 may use context features about surrounding areas of the superpixels as region features. Region features extracted from the superpixels $SP_k$ (k=1, . . . , K) will be denoted by $x_k$.

The processing of steps S201 and S202, and the processing of steps S203 and S204 are mutually independent processes. The order of execution of the two processes is not limited to that of the present exemplary embodiment. In another example, the processing of steps S203 and S204 may be performed before the processing of steps S201 and S202. In another example, the processing of steps S201 and S202, and the processing of steps S203 and S204 may be simultaneously performed.

In step S205, the identification unit 105 performs region identification of the input image I based on the region identifier selected in step S202 and the region features obtained from the superpixels.

More specifically, the identification unit 105 reads the region identifier $f_{s(I)}$ selected in step S202 from the region identifier storage unit 111. Suppose that the region identifier storage unit 111 contains $N_s$ region identifiers $f_s$ (s=1, . . . , $N_s$) previously obtained by the learning processing to be described below. The identification unit 105 inputs the region features $x_k$ about the respective superpixels $SP_k$ into the read region identifier $f_{s(I)}$ and outputs a score vector $f_{s(I)}$ ($x_k$) of the region classes. The score vector $f_{s(I)}$ ($x_k$) is an $N_c$-dimensional vector with respect to the total number $N_c$ of types of the region classes. The elements of the score vector $f_{s(I)}$ ($x_k$) are scores with respect to the respective region classes. The score of a c-th region class will be denoted by $f_{s(I),c}(x_k)$ (c=1, . . . , $N_c$). The score vector $f_{s(I)}$ ($x_k$) is given by (Eq. 3):

$$f_{s(I)}(x_k)=[f_{s(I),1}(x_k) \ldots f_{s(I),c}(x_k) \ldots f_{s(I),N_c}(x_k)] \quad \text{(Eq. 3)}$$

The identification unit 105 obtains the result of the region identification with respect to each superpixel $SP_k$ as a class $c_k$ that maximizes the score $f_{s(I),c}(x_k)$, as expressed by (Eq. 4):

$$c_k = \operatorname*{argmax}_c f_{s(I),c}(x_k) \quad \text{(Eq. 4)}$$

The identification unit 105 applies the region identifier $f_{s(I)}$ to all the superpixels $SP_k$ (k=1, . . . , K) included in the input image I to obtain all region identification results $c_k$, and ends the processing of step S205. FIG. 3 illustrates an example of a result 320 of the region identification processing. The processing of step S205 is an example of the region identification processing.

In step S206, the output unit 106 outputs the region identification results $c_k$ obtained in step S205. The output format is not particularly limited. For example, if the user visually observes the region identification results $c_k$, the output unit 106 outputs the region classes obtained as the region identification results $c_k$ in different colors on-screen. In another example, if other processing such as tagging is performed by using the region identification results $c_k$, the output unit 106 simply outputs position information about the superpixels $SP_k$ and the region identification results $c_k$ to the subsequent processing. The image identification processing is thus completed.

Figure 4B:
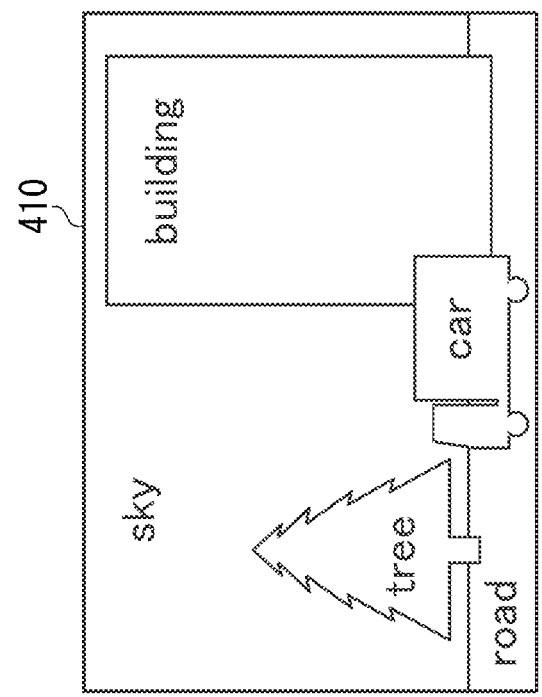
FIGS. 4A and 4B are diagrams illustrating training data.
Figure 4A:
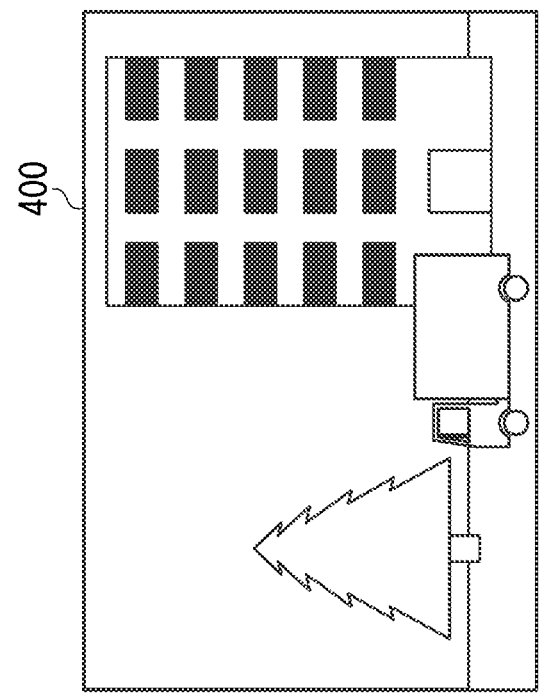

To perform the foregoing image identification processing, the region identifiers $f_s$ (s=1, . . . , $N_s$) and the determiner g for determining the suitability degrees of the region identifiers $f_s$ need to have been stored in the region identifier storage unit 111 and the determiner storage unit 110, respectively. The region identifiers $f_s$ and the determiner g are generated by the learning processing. The learning processing will be described below. FIGS. 4A and 4B are diagrams illustrating training data. The training data includes a training image 400 illustrated in FIG. 4A and region teacher data 410 illustrated in FIG. 4B. The region teacher data 410 is information including pixels to which desired region classes to be finally achieved when the training image 400 is used as an input image are attached. The region classes of the region teacher data 410 include semantic classes typically used in a Microsoft Research Cambridge (MSRC)-21 data set, such as a sky, a body, and a building. In another example, appearance-based classes such as a flat region and a texture region may be used.

Suppose that N training images $I_n$ (n=1, . . . , N) and region teacher data on the regions of each of the training images $I_n$ are stored in the training data storage unit 112 in advance. A set of all the training images $I_n$ will be assumed to be $U_0$ as expressed by (Eq. 5):

$$U_0=\{I_n|n=1,\ldots,N\} \quad \text{(Eq. 5)}$$

Suppose that there are a total of $N_c$ types of region classes. The region teacher data corresponding to a training image $I_n$ will be denoted by $GT_n$.

Figure 5:
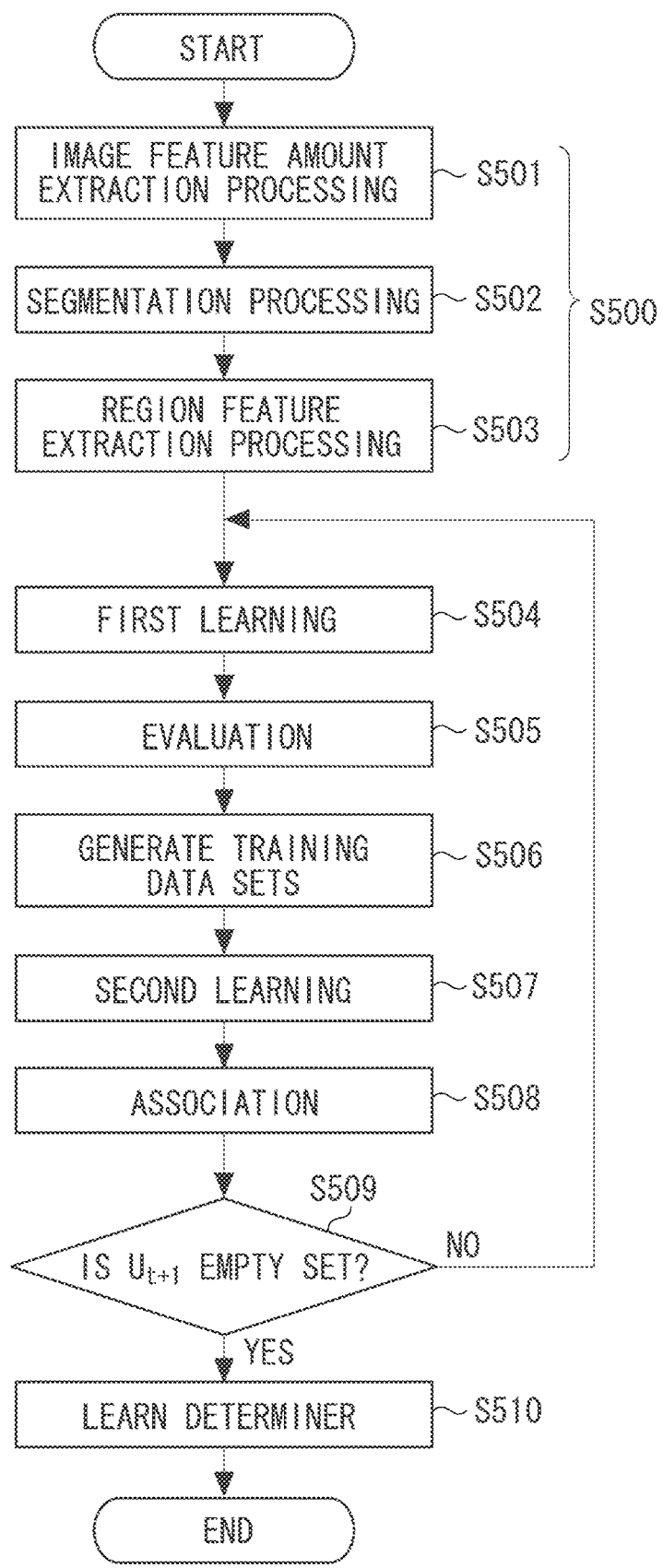
FIG. 5 is a flowchart illustrating learning processing.

FIG. 5 is a flowchart illustrating the learning processing by the image processing apparatus. In step S500, the training data setting unit 120 of the image processing apparatus performs training data setting processing. The training data setting processing includes image feature amount extraction processing (step S501), segmentation processing (step S502), and region feature extraction processing (step S503). In step S501, the training data setting unit 120 extracts an image feature of an entire image from each of the training images $I_n$ stored in the training data storage unit 112. The training data setting unit 120 extracts the same type of features as that of the image feature extracted in the processing of step S201 in the image identification processing illustrated in FIG. 2. The image feature extracted from a training image $I_n$ will be denoted by $F_n$.

In step S502, the training data setting unit 120 segments each training image $I_n$ into superpixels. The training data setting unit 120 segments the training image $I_n$ into superpixels by the same technique as that of the processing of step S203 in the image identification processing. Suppose $K_n$ superpixels are generated as a result of the superpixel segmentation on a training image $I_n$. The total number of training superpixels is given by $K_{all}=\Sigma K_n$. The superpixels of the training images $I_n$ are denoted by serial numbers $SP_j$ (j=1, . . . $K_{all}$). In step S503, the training data setting unit 120 extracts region features from all the superpixels $SP_j$ (j=1, ..., $K_{all}$) of all the training images $I_n$ obtained in step S502. The training data setting unit 120 extracts the same type of features as that of the region features extracted by the processing of step S204 in the image identification processing. The image feature extracted from a superpixel $SP_j$ will be denoted by $x_j$. An initial training data set $S_0$ including all the training superpixels $SP_j$ is given by (Eq. 6):

$$S_0 = \{SP_j | j=1, \ldots K_{all}\} \quad \text{(Eq. 6)}$$

The subsequent processing of steps S504 to S509 is repetitive processing. In an initial state, a counter t of the number of repetitions is set to t=1. At the time of the first repetition (t=1), the training data setting unit 120 is initialized to a training image set $U_1 = U_0$ and a training data set $S_1 = S_0$. For the second and subsequent repetitions (t=2, 3, ...), $U_L$ and $S_L$ are updated in step S509 to be described below.

In step S504, the first learning unit 121 learns a region identifier. The first learning unit 121 uses all superpixels included in a superpixel set $S_t$ as learning subjects. The first learning unit 121 initially calculates teacher vectors with respect to the superpixels $SP_j$. Suppose that a superpixel $SP_j$ is segmented from a training image $I_n$, and a region class label that occupies a large area at the position corresponding to the superpixel $SP_j$ of the region teacher data $GT_n$ is $c_j$. In such a case, a teacher vector $\tau_j$ with respect to the superpixel $SP_j$ is given by (Eq. 7):

$$\tau_j = [\tau_1 \ldots \tau_c \ldots \tau_{N_c}] \quad \text{(Eq. 7)}$$

Here, $\tau_{j,c}$ is given by (Eq. 8):

$$\tau_{j,c} = \begin{cases} 1 & \text{if } c = c_j \\ 0 & \text{otherwise} \end{cases} \quad \text{(Eq. 8)}$$

The first learning unit 121 may assign real values as the settings of the teacher vector $\tau_j$ instead of setting 1 or 0 as described above. For example, if the area ratios of the region class labels at the position corresponding to the superpixel $SP_j$ of the region teacher data $GT_n$ are $r_c$ (c=1, ..., $N_c$; $\Sigma r_c = 1$), the first learning unit 121 may calculate the teacher vector $\tau_j$ from (Eq. 9):

$$\tau_j = [r_1 \ldots r_c \ldots r_{N_c}] \quad \text{(Eq. 9)}$$

The first learning unit 121 generates a region identifier by adjusting parameters of an identification function so that an error between the output vector, obtained when the region feature $x_j$ is input into the identification function, and the teacher vector $\tau_j$ becomes small through the entire training data. The model of the identification function and the learning method thereof are not particularly limited. For example, the first learning unit 121 may use an SVM, a multilayer neural network, or logistic regression. The first learning unit 121 records the region identifier obtained by the learning into the region identifier storage unit 111 as a region identifier $f_{t,0}$. Here, step S504 is an example of the learning processing for generating an identifier based on a training image.

In step S505, the evaluation unit 122 evaluates the training data by using the region identifier $f_{t,0}$ generated in step S504. More specifically, the evaluation unit 122 inputs an image feature $x_j$ into the region identifier $f_{t,0}$ to obtain, as an output, a score vector $f_{t,0}(x_j)$ expressed by (Eq. 10):

$$f_{t,0}(x_j) = [f_{t,0,1}(x_j) \ldots f_{t,0,c}(x_j) \ldots f_{t,0,N_c}(x_j)] \quad \text{(Eq. 10)}$$

The evaluation unit 122 calculates the score vectors of all the region features $x_j$ (j=1, ..., $K_{all}$) by using (Eq. 10). In other words, the evaluation unit 122 obtains $K_{all}$ score vectors $f_{t,0}(x_j)$ (j=1, ..., $K_{all}$).

Figure 6:
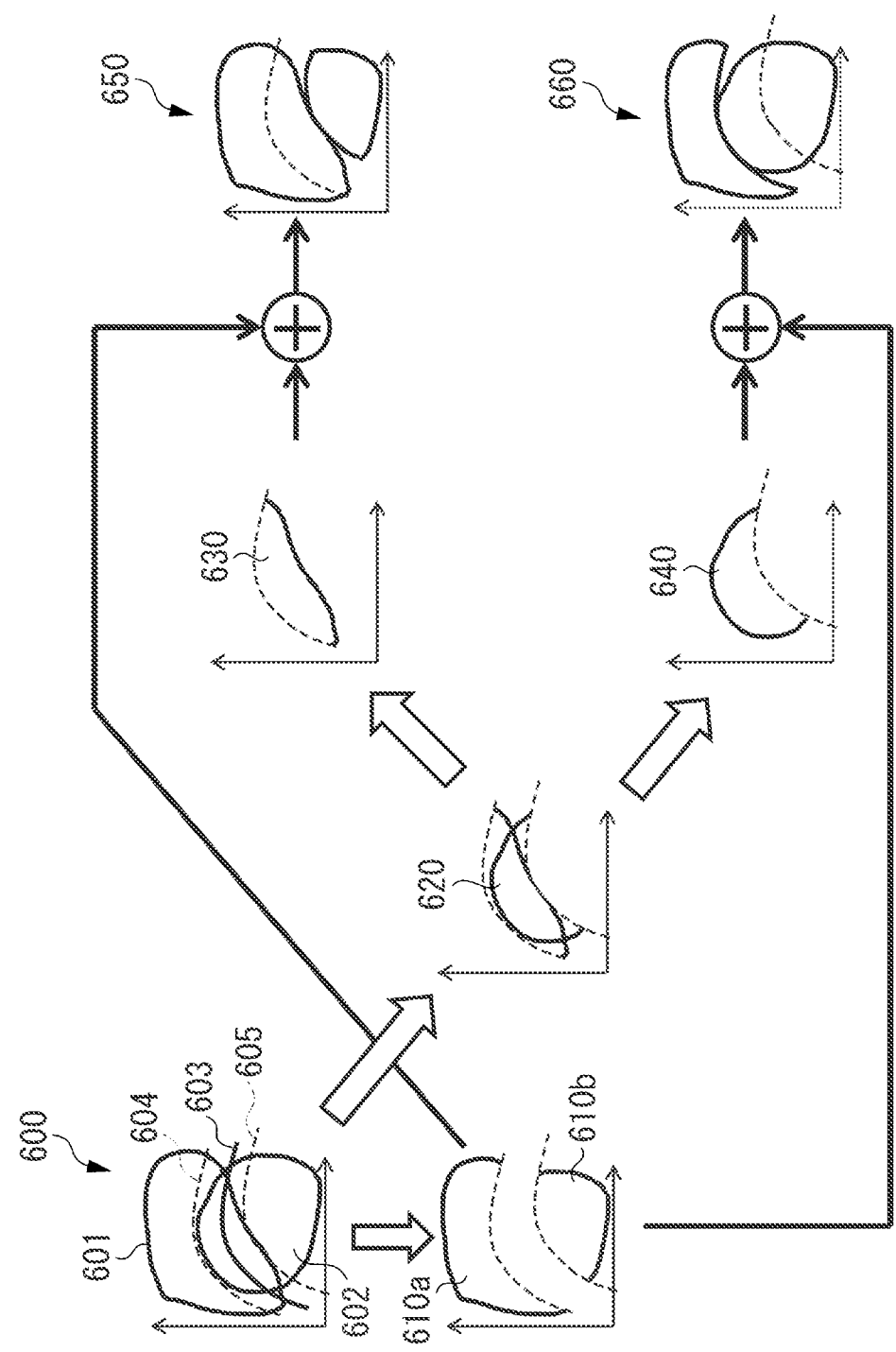
FIG. 6 is a diagram illustrating training data set generation processing.

In step S506, the data set generation unit 123 generates a data set of training images (training data set) for learning region identifiers according to variations of imaging conditions based on the evaluation result of step S505. FIG. 6 is a diagram illustrating training data set generation processing. For the sake of simplicity, FIG. 6 illustrates a case where $N_c = 2$. In FIG. 6, a distribution 600 of a superpixel set $S_t$ in a feature space includes a distribution 601 of the first region class (c=1), a distribution 602 of the second region class (c=2), and an identification boundary 603 between the two region classes. On the identification boundary 603, $f_{t,0,1} = f_{t,0,2}$ holds.

The data set generation unit 123 divides all the training superpixels $SP_j$ into two image groups, or correct data and incorrect data, as described below based on the score vectors $f_{t,0}(x_j)$ (j=1, ..., $K_{all}$) obtained as the evaluation result with respect to the training superpixels $SP_j$. More specifically, the data set generation unit 123 calculates an evaluation value $scoredif_j$ of a training superpixel $SP_j$ by (Eq. 11):

$$scoredif_j = \min_{c \neq c_j} \{f_{t,0,c_j}(x_j) - f_{t,0,c}(x_j)\} \quad \text{(Eq. 11)}$$

It indicates that the training superpixel $SP_j$ is identified better as the evaluation value $scoredif_j$ is greater. If the evaluation value $scoredif_j$ has a negative value, it means that the superpixel $SP_j$ is erroneously identified. The data set generation unit 123 determines the training superpixel $SP_j$ to be "correct data" if the evaluation value $scoredif_j$ is greater than or equal to a predetermined threshold as expressed by (Eq. 12). The data set generation unit 123 determines the training superpixel $SP_j$ to be "incorrect data" if the evaluation value $scoredif_j$ is smaller than the predetermined threshold as expressed by (Eq. 13). For example, the threshold is $\theta = 0.3$. In such a manner, the data set generation unit 123 divides the training superpixels $SP_j$ into a correct data set $S_{true}$ and an incorrect data set $S_{false}$.

$$S_{true} = \{SP_j | scoredif_j \geq \theta\} \quad \text{(Eq. 12)}$$

$$S_{false} = \{SP_j | scoredif_j < \theta\} \quad \text{(Eq. 13)}$$

In FIG. 6, $scoredif_j = \theta$ holds for boundaries 604 and 605 of the correct and incorrect data set $S_{true}$ and $S_{false}$. From (Eq. 12) and (Eq. 13), the superpixel set $S_t$ expressed by the distribution 600 of FIG. 6 is divided into an image group denoted by 610a and 610b (correct data set $S_{true}$) and an image group denoted by 620 (incorrect data set $S_{false}$).

The data set generation unit 123 further divides the incorrect data set $S_{false}$ for each region class according to (Eq. 14):

$$S_{false,c} = \{SP_j | scoredif_j < \theta \cap c_j = c\} (c=1, \ldots, N_c) \quad \text{(Eq. 14)}$$

FIG. 6 illustrates a state where the incorrect data set $S_{false}$ 620 is divided into $S_{false,1}$ 630 and $S_{false,2}$ 640 according to (Eq. 14). By using such data sets, the data set generation unit 123 generates a training data set of the region class c by (Eq. 15). More specifically, the data set generation unit 123 combines the correct data set $S_{true}$ of the region class c with a region of the incorrect data set $S_{false}$ corresponding to the correct data set $S_{true}$ i.e., an image group of the region class c, to generate a new training image.

$$S_{t,c} = S_{true} \cup S_{false,c} \quad \text{(Eq. 15)}$$

FIG. 6 illustrates $S_{t,1}$ 650 and $S_{t,2}$ 660 which are generated according to (Eq. 15). The processing of step S506 is an example of image generation processing for extracting images in units of superpixels from one or more training images to generate new training images based on the evaluation result of a training image by an identifier.

In step S507, the second learning unit 124 learns region identifiers by using the training data sets generated in step S506. More specifically, the second learning unit 124 performs learning by using each of the training data sets $S_{t,c}$ (c=1, . . . , $N_c$) to generate Nc region identifiers. The region identifier learned by using a training data set $S_{t,c}$ will be denoted by $f_{t,c}$. The method of learning using each training data set $S_{t,c}$ is similar to that of the first learning processing in step S504. The second learning unit 124 records the generated region identifiers $f_{t,c}$ (c=1, . . . , $N_c$) into the region identifier storage unit 111. The processing of step S507 is an example of learning processing for generating an identifier based on a generated new training image.

In step S508, the association unit 125 associates the region identifiers generated in steps S504 and S507 with the training images. More specifically, the association unit 125 here subjects the region identifier $f_{t,0}$ generated in step S504 and the region identifiers $f_{t,c}$ (c=1, . . . , $N_c$) generated in step S507 to the processing. In other words, the association unit 125 subjects the ($N_c$+1) region identifiers $f_{t,\gamma}$ ($\gamma$=0, . . . , $N_c$) to the processing. The association unit 125 then outputs results obtained by inputting all the training images $I_n$ (n=1, . . . , N) in the initial training image set $U_0$ into each of the region identifiers $f_{t,\gamma}$. The association unit 125 compares the obtained region identification results with the region teacher data $GT_n$ to make an evaluation in terms of a recognition ratio. Examples of a definition of the recognition ratio include pixel accuracy, which is expressed as a ratio of the number of pixels, found to have a matched region class when the region classes of the output pixels are compared with the region teacher data, with respect to the total number of pixels. Other examples of the definition of the recognition ratio may include an F value obtained by determining a recall ratio and a matching ratio relating to each region class and determining a harmonic average thereof. The definition of the recognition ratio is not particularly limited.

The recognition ratio of a region identifier $f_{t,\gamma}$ with respect to a training image $I_n$ will be denoted by $R_{n,\gamma}$. If the recognition ratio $R_{n,\gamma}$ is higher than or equal to a predetermined threshold $\eta$ (e.g., $\eta$=0.9), the association unit 125 determines the training image $I_n$ to be a positive image corresponding to the region identifier $f_{t,\gamma}$. The association unit 125 generates a positive image set $T_{t,\gamma}$ by (Eq. 16):

$$T_{t,\gamma} = \{I_n | R_{n,\gamma} \geq \eta\} (\gamma=0, \ldots, N_c) \quad \text{(Eq. 16)}$$

The association unit 125 further determines a training image set $U_{t+1}$ for the next loop by removing the training images included in the foregoing positive image sets $T_{t,\gamma}$ ($\gamma$=0, . . . , $N_c$) from the training image set $U_t$ by (Eq. 17):

$$U_{t+1} = U_t \setminus \bigcup_{\gamma} T_{t,\gamma} \quad \text{(Eq. 17)}$$

The set of superpixels obtained from the training images included in the training image set $U_{t+1}$ will be denoted by $S_{t+1}$. In step S509, if the training image set $U_{t+1}$ is an empty set (YES in step S509), the association unit 125 ends the repetitive processing. The processing then proceeds to step S510. On the other hand, if the training image set $U_{t+1}$ is not an empty set (NO in step S509), the association unit 125 increments the value of the counter t. Then, the processing proceeds to step S504.

In step S510, the third learning unit 126 learns a determiner for the region identifiers generated in steps S504 and S507. The determiner is intended to output the suitability degrees of the corresponding region identifiers. For the sake of simplicity, the indexes of all the region identifiers $f_{t,\gamma}$ generated in steps S504 and S507 will be renumbered with serial numbers. Assuming that the number of generated region identifiers is $N_s$, the renumbered indexes of the region identifiers are denoted by $f_s$ (s=1, . . . $N_s$). Similarly, the indexes of the positive image sets $T_{t,r}$ will be renumbered as $T_s$ (s=1, . . . , $N_s$). The notations at the time of the foregoing image identification processing are compliant with such renumbered indexes.

The third learning unit 126 determines a teacher signal $\rho_n$ of the suitability degrees expressed by (Eq. 18) for all the training images $I_n$ (n=1, . . . , N) in the initial training image set $U_0$. $\rho_{n,s}$ is given by (Eq. 19):

$$\rho_n = [\rho_{n,1} \cdots \rho_{n,s} \cdots \rho_{n,N_s}] \quad \text{(Eq. 18)}$$

$$\rho_{n,s} = \begin{cases} 1 & \text{if } I_n \in T_s \\ 0 & \text{otherwise} \end{cases} \quad \text{(Eq. 19)}$$

With the image features $F_n$ (n=1, . . . N) extracted in step S501 being as inputs, the third learning unit 126 learns the determiner for determining the suitability degrees of the region identifiers $f_s$ based on the teacher signals $\rho_n$ (n=1, . . . , N). As with the region identifiers $f_s$, examples of the model of the determiner may include an SVM, a multilayer neural network, and logistic regression. The type of the determiner is not particularly limited. The determiner may be of the same model as or of a different model from that of the region identifiers $f_s$. For example, the region identifiers $f_s$ may be generated by an SVM, and the determiner may be generated by logistic regression. The third learning unit 126 stores the determiner obtained by the learning into the determiner storage unit 110 as a determiner g. The learning processing is thus completed. The processing of step S510 is an example of determiner generation processing for generating a determiner for determining the suitability degree of an identifier based on a training image.

As described above, in the learning processing, the determiner g and the region identifiers $f_s$ (s=1, . . . , $N_s$) are generated and recorded into the determiner storage unit 110 and the region identifier storage unit 111, respectively. This enables the image processing apparatus to perform the foregoing image identification processing.

In such a manner, the image processing apparatus according to the first exemplary embodiment can automatically generate training images that enable region determination suitable for each captured image even if image features vary, for example, due to imaging conditions such as daytime sky and evening sky. In other words, the image processing apparatus can generate region identifiers according to situations. The image processing apparatus can further select a situation to improve the accuracy of region identification. The image processing apparatus can thus accurately identify images even if image features vary due to a change of the imaging condition.

The image processing apparatus according to the first exemplary embodiment divides the incorrect data for each region class, and combines each piece of incorrect data with the correct data to generate a training data set. On the other hand, an image processing apparatus according to a second exemplary embodiment subdivides the incorrect data and gradually adds superpixel data to generate a training data set. The image processing apparatus according to the second exemplary embodiment will be described below. The image processing apparatus according to the second exemplary embodiment differs from the image processing apparatus according to the first exemplary embodiment in the processing of the training data set generation processing (step S506) and the second learning processing (step S507) illustrated in FIG. 5. Differences of the image processing apparatus according to the second exemplary embodiment from the image processing apparatus according to the first exemplary embodiment will be described below.

Figure 7:
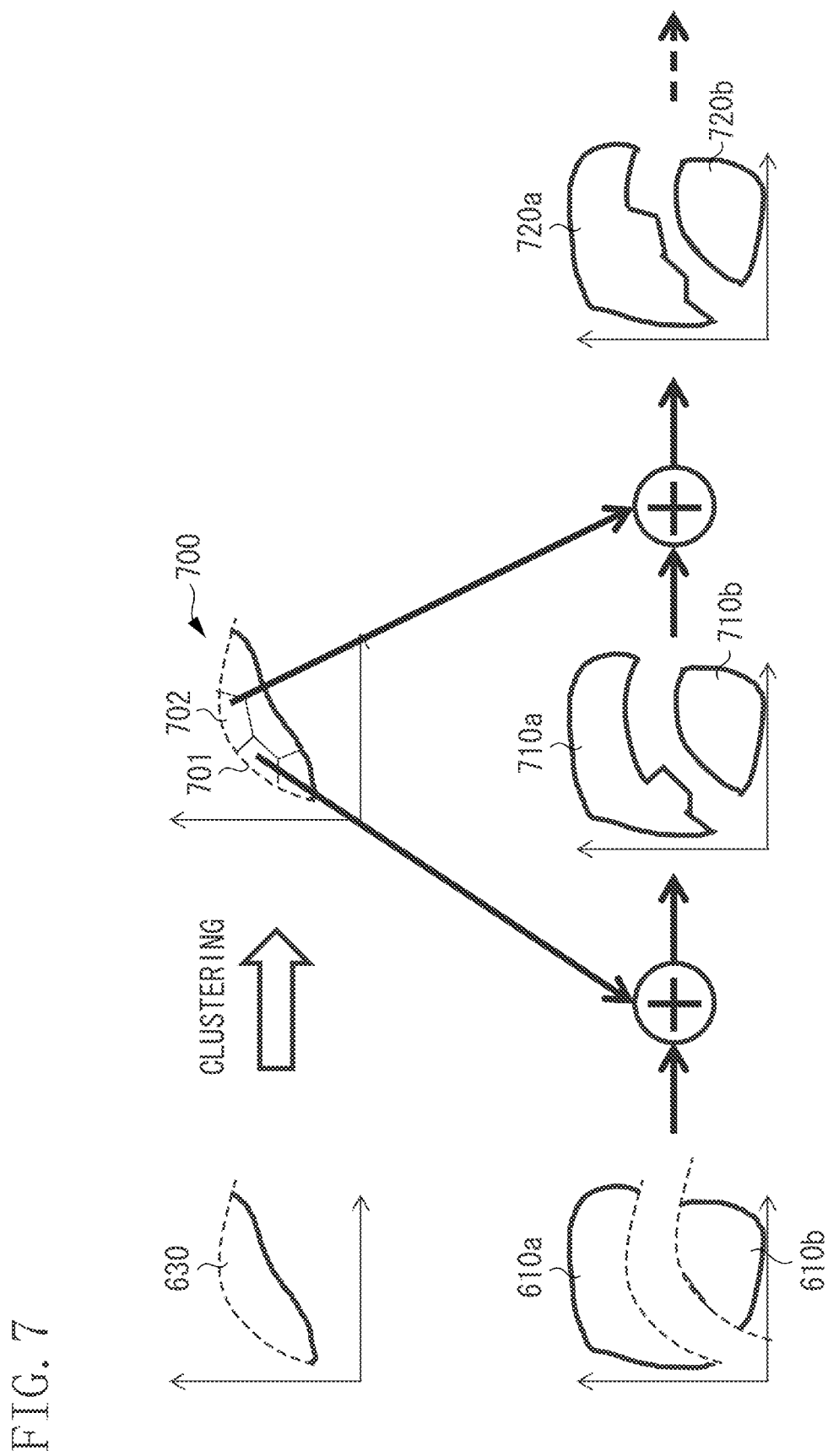
FIG. 7 is a diagram illustrating training data set generation processing according to a second exemplary embodiment.

FIG. 7 is a diagram illustrating the training data set generation processing (step S506) by the image processing apparatus according to the second exemplary embodiment. Here, for the sake of simplicity, the number of classes is assumed to $N_c=2$. First, in step S506, the data set generation unit 123 calculates the evaluation value $scoredif_j$ of the correct region class $c_j$ of the training superpixel $SP_j$ in comparison to the scores of the other region classes according to (Eq. 11). Next, the data set generation unit 123 generates a correct data set $S_{true}$ and an incorrect data set $S_{false}$ according to (Eq. 12) and (Eq. 13). The data set generating unit 123 further divides the incorrect data set $S_{false}$ for each region class to generate $S_{false,c}$ (c=1, . . . , $N_c$) according to (Eq. 14).

The data set generation unit 123 then subdivides the incorrect data set $S_{false,c}$ of each region class into clusters on a feature space. The clustering technique may be an existing one and is not particularly limited. Examples of the clustering technique include k-means, agglomerative clustering, and hierarchical clustering. FIG. 7 illustrates a clustering result 700 of the incorrect data 630 illustrated in FIG. 6. The number of clusters in a region class c will be denoted by $L_c$. The index of each cluster is denoted by l. An l-th cluster of the region class c is expressed as $CL_{c,l}$ (l=1, . . . , $L_c$).

Next, the data set generation unit 123 calculates a sum $D_{c,l}$ of the evaluation values $scoredif_j$ of each cluster $CL_{c,l}$ by (Eq. 20):

$$D_{c,l} = \sum_{j, SP_j \in CL_{c,l}} scoredif_j \qquad \text{(Eq. 20)}$$

The value of $D_{c,l}$ indicates how correctly the superpixels $SP_j$ belonging to the cluster $CL_{c,l}$ are determined. The index of a cluster that maximizes the value of $D_{c,l}$ among the clusters in the region class c will be denoted by lmax. lmax is expressed by (Eq. 21):

$$lmax = \underset{l}{\arg\max}\, D_{c,l} \qquad \text{(Eq. 21)}$$

The cluster that maximizes $D_{c,l}$ in the region class c is expressed as $CL_{c,lmax}$.

Figure 8:
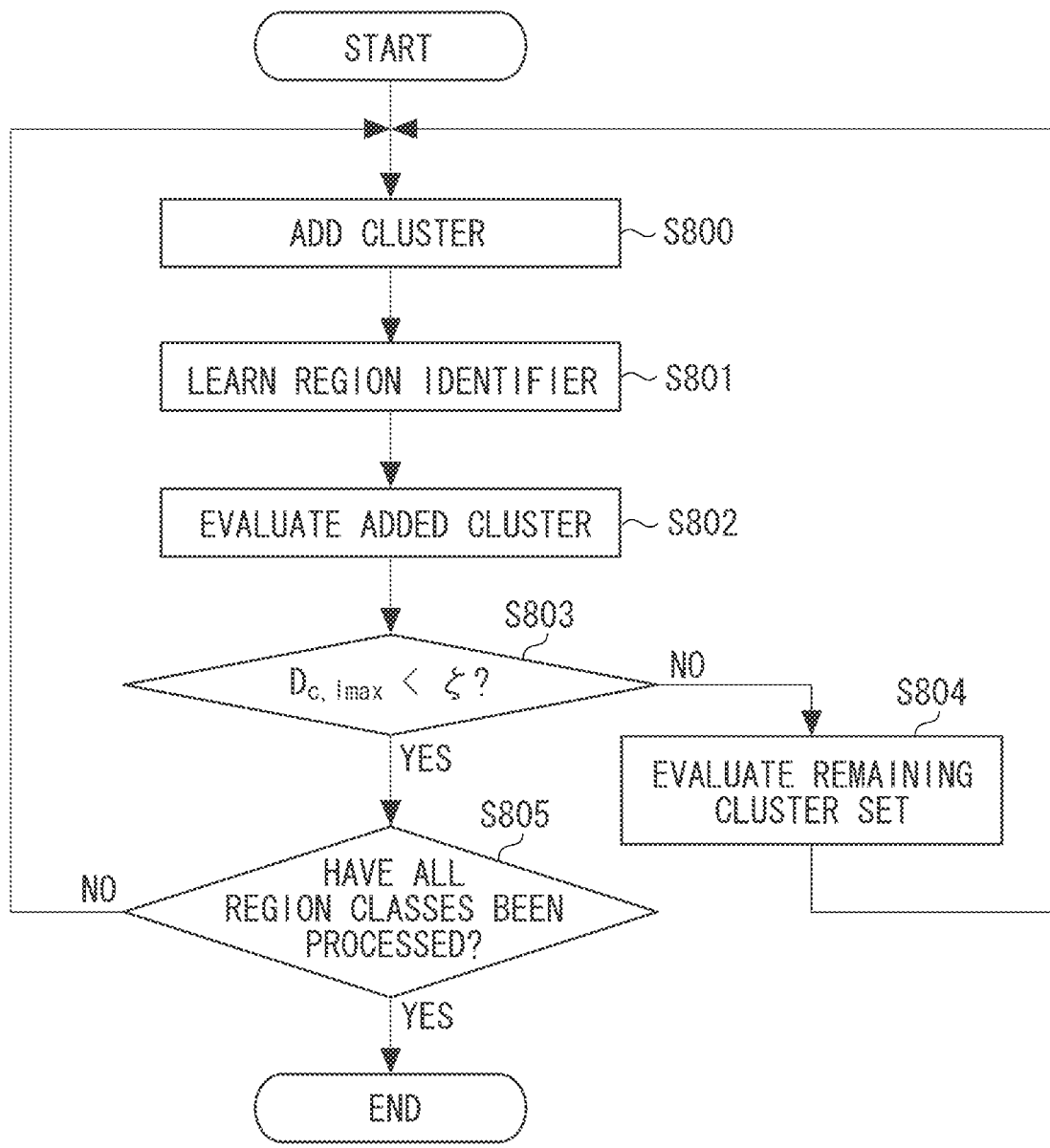
FIG. 8 is a flowchart illustrating second learning processing according to the second exemplary embodiment.

FIG. 8 is a flowchart illustrating detailed processing in the second learning processing (step S507) by the image processing apparatus according to the second exemplary embodiment. The processing of steps S800 to S804 is repetitive processing to be performed on each region class c (c=1, . . . , $N_c$). At the beginning of the repetitive processing, the second learning unit 124 first initializes a remaining cluster set $V_c$ to include all the clusters $CL_{c,l}$ (l=1, . . . , $L_c$). The remaining cluster set $V_c$ is expressed by (Eq. 22):

$$V_c = \bigcup_l CL_{c,l} \qquad \text{(Eq. 22)}$$

In step S800, as expressed by (Eq. 23), the second learning unit 124 determines a union of all the superpixels $SP_j$ included in the cluster $CL_{c,lmax}$ and the correct data set $S_{true}$ as a training data set $S_{t,c}$. In other words, the second learning unit 124 combines all the superpixels $SP_j$ of the cluster $CL_{c,lmax}$ with the correct data set $S_{true}$ to generate a new training image:

$$S_{t,c} = S_{true} \cup CL_{c,lmax} \qquad \text{(Eq. 23)}$$

FIG. 7 illustrates a union of the correct data 610a and 610b and a cluster $CL_{c,lmax}$ 701, i.e., a training data set $S_{t,c}$ 710a and 710b obtained by (Eq. 23).

In step S801, the second learning unit 124 learns a region identifier $f_{t,c}$ by using the training data set $S_{t,c}$ obtained in step S800. The processing for learning the region identifier $f_{t,c}$ is similar to the processing for learning a region identifier in the second learning processing (step S507) according to the first exemplary embodiment. In step S802, the second learning unit 124 calculates an identification result when the superpixels $SP_j$ that are the elements of the cluster $CL_{c,lmax}$ added in step S800 are input to the region identifier $f_{t,c}$. More specifically, the second learning unit 124 calculates the value of the evaluation value $scoredif_j$ of each superpixel $SP_j$ by (Eq. 11). The second learning unit 124 further calculates the sum $D_{c,lmax}$ of the obtained values in the cluster $CL_{c,lmax}$.

In step S803, if the value of the sum $D_{c,lmax}$ is greater than or equal to a predetermined threshold $\zeta$ (for example, $\zeta=0.3$) (NO in step S803), the processing proceeds to step S804. On the other hand, if the value of the sum $D_{c,lmax}$ is smaller than the predetermined threshold $\zeta$ (YES in step S803), the second learning unit 124 restores the region identifier $f_{t,c}$ to the state at the previous repetition time, and stores the restored region identifier $f_{t,c}$ into the region identifier storage unit 111. In step S805, if there is an unprocessed region class c (NO in step S805), the processing proceeds to step S800. In step S800, the second learning unit 124 continues processing for the unprocessed region class c.

In step S804, the second learning unit 124 subtracts $CL_{c,lmax}$ from the remaining cluster set $V_c$ for update as expressed by (Eq. 24):

$$V_c \leftarrow V_c \setminus CL_{c,lmax} \qquad \text{(Eq. 24)}$$

The second learning unit 124 then evaluates all the superpixel data belonging to the remaining cluster set $V_c$ by using the region identifier $f_{t,c}$. Based on the evaluation result, the second learning unit 124 re-determines $CL_{c,lmax}$ from among the clusters that are the elements of the remaining cluster set $V_c$ according to (Eq. 20) and (Eq. 21). The processing proceeds to step S800. FIG. 7 illustrates a remaining data set $S_{t,c}$ 720a and 720b that is updated by the addition of the cluster 702 as a result of repetition of the cluster addition processing (step S800). If the second learning unit 124 has completed the repetitive processing about all the region classes c (YES in step S805), the processing proceeds to the association processing (step S508) illustrated in FIG. 5. The rest of the configuration and processing of the image processing apparatus according to the second exemplary embodiment are similar to the configuration and processing of the image processing apparatus according to the first exemplary embodiment.

The image processing apparatuses according to the first and second exemplary embodiments handle the training data in units of superpixels. On the other hand, an image processing apparatus according to a third exemplary embodiment handles the training data in units of images. The image processing apparatus according to the third exemplary embodiment will be described below. The image processing apparatus according to the third exemplary embodiment differs from the image processing apparatus according to the first exemplary embodiment in the processing of the training data set generation processing (step S506) and the second learning processing (step S507) illustrated in FIG. 5. Differences of the image processing apparatus according to the third exemplary embodiment from the image processing apparatuses according to the first and second exemplary embodiments will be described below.

In the training data set generation processing (step S506), the second learning unit 124 generates a data set for learning region identifiers according to a change in the imaging situation based on the evaluation result of the evaluation processing (step S505). More specifically, the second learning unit 124 calculates the evaluation values scoredif$_j$ of the training superpixels SP$_j$ according to (Eq. 11), and generates correct data $S_{true}$ according to (Eq. 12). Next, the second learning unit 124 calculates an occupancy degree $E_{n,c}$ of an image $I_n$ included in the training image set $U_t$ with respect to a region class c by (Eq. 25):

$$E_{n,c} = \sum_{j \in I_n} A_j \delta(c_j = c) \text{scoredif}_j \qquad \text{(Eq. 25)}$$

$A_j$ is the area of the superpixel SP$_j$. $\delta$ is the Kronecker delta, which is expressed as (Eq. 26):

$$\delta(z) = \begin{cases} 1 & \text{if } z = \text{true} \\ 0 & \text{otherwise} \end{cases} \qquad \text{(Eq. 26)}$$

The value of (Eq. 25) indicates how correctly the image $I_n$ is determined with respect to the region class c. The index of the image that maximizes the value will be denoted by cmax. cmax is expressed as (Eq. 27):

$$\text{cmax} = \underset{n}{\text{argmax}} E_{n,c} \qquad \text{(Eq. 27)}$$

The image that maximizes the value of E is expressed as $I_{cmax}$.

Figure 9:
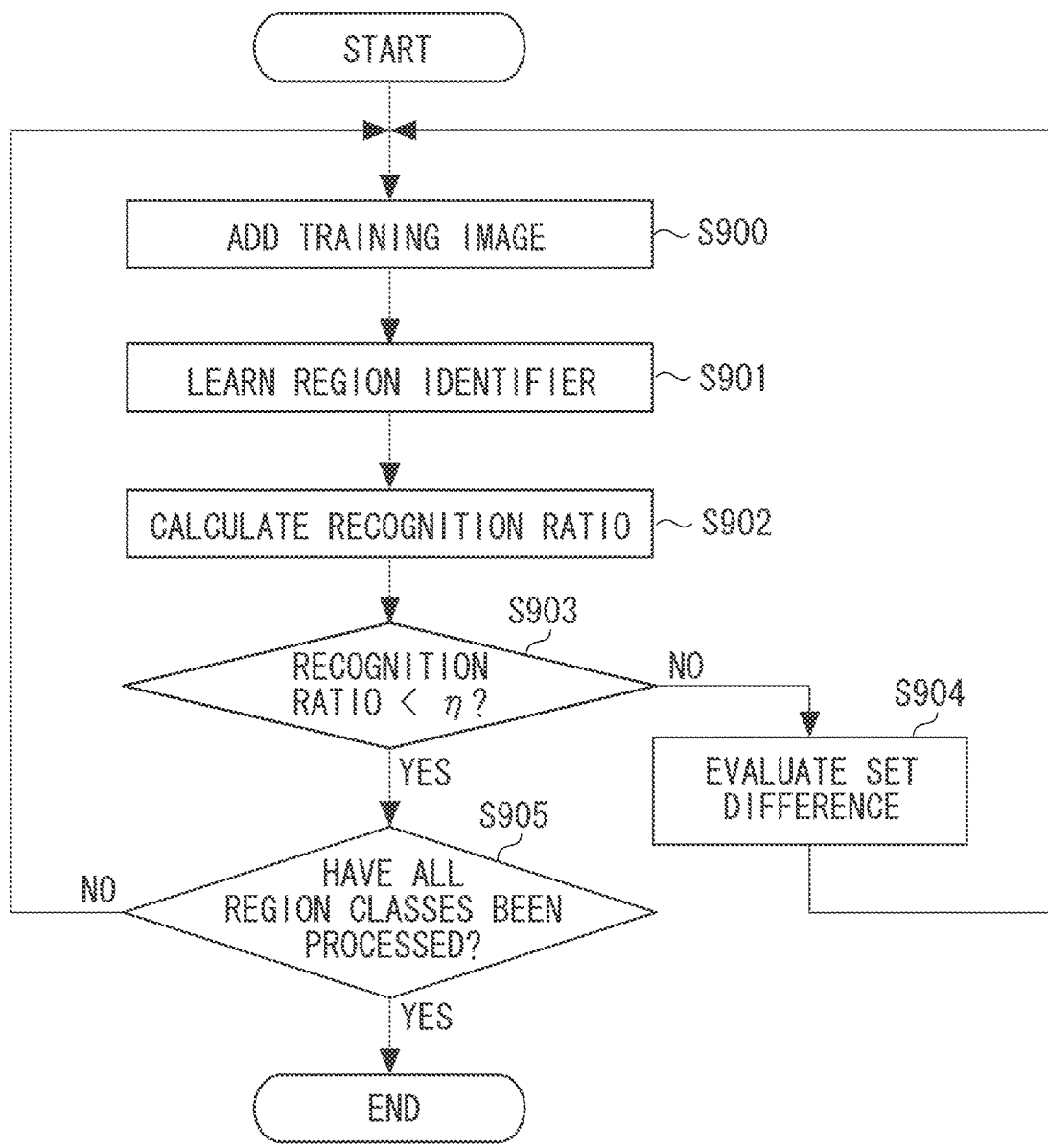
FIG. 9 is a flowchart illustrating second learning processing according to a third exemplary embodiment.

FIG. 9 is a flowchart illustrating detailed processing in the second learning processing (step S507) by the image processing apparatus according to the third exemplary embodiment. The processing of steps S900 to S904 is repetitive processing to be performed on each region class c (c=1, ..., N$_c$). At the beginning of the repetitive processing, the second learning unit 124 first initializes an added image set U$_{add}$ to be an empty set. In step S900, as expressed by (Eq. 28), the second learning unit 124 determines a union of all the superpixels SP$_j$ included in the image $I_{cmax}$ and the correct data set $S_{true}$ as a training data set $S_{t,c}$. In other words, the second learning unit 124 adds all the superpixels SP$_j$ included in the image $I_{cmax}$ to the correct data set $S_{true}$:

$$S_{t,c} = S_{true} \cup \{SP_j | SP_j \in I_{cmax}\} \qquad \text{(Eq. 28)}$$

The second learning unit 124 further adds the image $I_{cmax}$ to the added image set U$_{add}$ as expressed by (Eq. 29):

$$U_{add} \leftarrow U_{add} \cup I_{cmax} \qquad \text{(Eq. 29)}$$

In step S901, the second learning unit 124 learns a region identifier $f_{t,c}$ by using the training data set $S_{t,c}$ obtained in step S900. The processing for learning the region identifier $f_{t,c}$ is similar to the processing for learning a region identifier in the second learning processing (step S507) according to the first exemplary embodiment. In step S902, the second learning unit 124 calculates a region identification result when the training image $I_{cmax}$ added in step S900 is input to the region identifier $f_{t,c}$. The second learning unit 124 then compares the obtained region identification result with the region teacher data GT$_{cmax}$ to calculate a recognition ratio. In step S903, if the recognition ratio is higher than or equal to a predetermined threshold θ (for example, θ=0.8) (NO in step S903), the processing proceeds to step S904. If the recognition ratio is lower than the predetermined threshold n (YES in step S903), the second learning unit 124 restores the region identifier $f_{t,c}$ to the state at the previous repetition time, and stores the restored region identifier $f_{t,c}$ into the region identifier storage unit 111. In step S905, if there is an unprocessed region class c (NO in step S905), the processing proceeds to step S900. In step S900, the second learning unit 124 continues processing with the unprocessed region class c as a processing target.

In step S904, the second learning unit 124 evaluates, using the region identifier $f_{t,c}$, a difference set U$_{sub}$ of the entire training image set U$_0$ and the added image set U$_{add}$ expressed by (Eq. 30):

$$U_{sub} = U_0 \backslash U_{add} \qquad \text{(Eq. 30)}$$

The second learning unit 124 replaces the image $I_{cmax}$ with an image having the highest occupancy degree E in the set difference U$_{sub}$ according to (Eq. 25) to (Eq. 27). The processing then proceeds to step S900. If the second learning unit 124 has completed the repetitive processing on all the region classes c (YES in step S905), the processing proceeds to the association processing (step S508) illustrated in FIG. 5. The rest of the configuration and processing of the image processing apparatus according to the third exemplary embodiment are similar to the configuration and processing of the image processing apparatuses according to the other exemplary embodiments.

As described above, the image processing apparatus according to the present exemplary embodiment can generate a plurality of region identifiers and a determiner corresponding to the region identifiers by setting a training data set in units of images.

The image processing apparatuses according to the first to third exemplary embodiments select one region identifier and uses the region identifier to obtain a region identification result in the image identification processing. On the other hand, an image processing apparatus according to a fourth exemplary embodiment obtains a region identification result by assigning weights to the results of all the region identifiers and determining a sum total. The image processing apparatus according to the fourth exemplary embodiment will be described below. Here, differences of the image processing apparatus according to the fourth exemplary embodiment from the image processing apparatus according to the first exemplary embodiment will be described. The image identification processing by the image processing apparatus according to the fourth exemplary embodiment is described below with reference to FIG. 2.

The image setting processing (step S200) and the image feature extraction processing (step S201) by the image processing apparatus according to the fourth exemplary embodiment are similar to those described in the first exemplary embodiment. After the processing of step S201, in step S202, the determination unit 102 calculates the suitability degree of each region identifier stored in the region identifier storage unit 111 by (Eq. 1). Here, the determination unit 102 does not perform the processing for calculating the index s(I) of the region identifier that maximizes the suitability degree $g_s(F)$ by (Eq. 2). The subsequent segmentation processing (step S203) and region feature extraction processing (step S204) are similar to those described in the first exemplary embodiment.

Subsequent to step S204, in step S205, the identification unit 105 makes a determination about all the superpixels $SP_k$ of the input image by using all the region identifiers $f_s$ (s=1, . . . , $N_s$) stored in the region identifier storage unit 111. The output of a region identifier $f_s$ is expressed as (Eq. 31):

$$f_s(x_k) = [f_{s,1}(x_k) \ldots f_{s,c}(x_k) \ldots f_{s,N_c}(x_k)] \quad \text{(Eq. 31)}$$

A final score $SCORE_c(x_k)$ of each region class c is expressed by a weighted linear sum with the suitability degrees, or outputs, of the determiner as expressed by (Eq. 32):

$$SCORE_c(x_k) = \sum_s g_s(F) f_{s,c}(x_k) \quad \text{(Eq. 32)}$$

The identification unit 105 obtains the region identification result with respect to each superpixel $SP_k$ as a region class $c_k$ that maximizes the value of $SCORE_c$ as expressed by (Eq. 33):

$$c_k = \underset{c}{\operatorname{argmax}} SCORE_c(x_k) \quad \text{(Eq. 33)}$$

The subsequent region identification result output processing (step S206) is similar to that described in the first exemplary embodiment.

Next, the learning processing for implementing the image identification processing according to the fourth exemplary embodiment will be described. The learning processing by the image processing apparatus according to the fourth exemplary embodiment differs from the learning processing according to the other exemplary embodiments only in the determiner learning processing (step S510). The determiner learning processing (step S510) by the image processing apparatus according to the fourth exemplary embodiment will be described below. In the determiner learning processing (step S501), the third learning unit 126 performs region identification on all the superpixels of all the training images $I_n$ (n=1, . . . , N) by using the region identifiers $f_s$ (s=1, . . . , $N_s$) obtained by learning. If the output values of the region identifiers $f_s$ obtained for the superpixels are assumed to be the output values of pixels in the superpixels, the output values are obtained pixel by pixel of the images. For the sake of simplicity, all the pixels of a training image $I_n$ will be denoted by serial numbers p. The number of pixels will be denoted by $N_p$. An output vector $e_n(p,c)$ of a pixel p of a training image In with respect to a region class c is expressed as (Eq. 34):

$$e_n(p,c) = [e_{n,1}(p,c) \ldots e_{n,s}(p,c) \ldots e_{n,N_s}(p,c)] \quad \text{(Eq. 34)}$$

where, $e_{n,s}(p, c)$ is expressed by (Eq. 35):

$$e_{n,s}(p,c) = f_{s,c}(x_k) \text{ if } p \in SP_k \quad \text{(Eq. 35)}$$

The third learning unit 126 multiplies the output vector $e_n(p,c)$ by a weighting factor vector $w_n$ to obtain an integrated output value of the pixel p of the training image $I_n$ with respect to the region class c. More specifically, based on the region teacher data $GT_n$ (n=1, . . . , N), when that a correct region class of the pixel p is c(p), the third learning unit 126 sets a teacher vector $\mu_p$ with respect to the pixel p as expressed by (Eq. 36):

$$\mu_p = [\mu_{p,1} \ldots \mu_{p,c} \ldots \mu_{p,N_c}] \quad \text{(Eq. 36)}$$

where $\mu_{p,c}$ is expressed by (Eq. 37):

$$\mu_{p,c} = \begin{cases} 1 & \text{if } c = c(p) \\ 0 & \text{otherwise} \end{cases} \quad \text{(Eq. 37)}$$

An error function $E_n$ for the training image $I_n$ will be defined as follows:

$$E_n = \frac{1}{2} \sum_p \sum_c (w_n e_n^T(p,c) - \mu_{p,c})^2 \quad \text{(Eq. 38)}$$

Here, T represents a transpose of the matrix or vector. The value of $w_n$ that minimizes the error function $E_n$ can be analytically determined by the least squares method by (Eq. 39):

$$w_n^T = (F^T F)^{-1} F^T \mu^T \quad \text{(Eq. 39)}$$

Here, $\mu$ is an $N_c \times N_p$-dimensional vector in which the teacher vectors $\mu_p$ of all the pixels p are listed. $\mu$ is expressed by (Eq. 40):

$$\mu = [\mu_1 \ldots \mu_p \ldots \mu_{N_p}] \quad \text{(Eq. 40)}$$

F is called a design matrix, of which an i-th row, j-th column element $F_{ij}$ is given by (Eq. 41):

$$F_{ij} = e_{n,i}(p,c) \quad \text{(Eq. 41)}$$

where the index j indicates the combination of the pixel p and the region c, where j=p ($N_c$−1)+c.

The third learning unit 126 sets the value of $w_n$ obtained above as the teacher vector of the determiner for the training image $I_n$. More specifically, the third learning unit 126 set the teacher signal $p_n$ with respect to the training image $I_n$ as expressed by (Eq. 42):

$$\rho_n = w_n \quad \text{(Eq. 42)}$$

Based on the teacher signal $\rho_n$, the third learning unit 126 learns a determiner g by regression learning, and stores the generated determiner g into the determiner storage unit 110. Examples of the processing of the regression learning include logistic regression, support vector regression (SVR), and a regression tree. The processing of the regression learning is not particularly limited. The rest of the configuration and processing of the image processing apparatus according to the fourth exemplary embodiment are similar to the configuration and processing of the image processing apparatuses according to the other exemplary embodiments.

As described above, the image processing apparatus according to the fourth exemplary embodiment can assign weights to the outputs of a plurality of region identifiers by using the respective suitability degrees, and add up the resulting values to obtain a result of segmentation.

The image processing apparatuses according to the first to fourth exemplary embodiments generate a plurality of region identifiers and a corresponding determiner by using all the training images. On the other hand, an image processing apparatus according to a fifth exemplary embodiment divides the training images into a plurality of groups, and generates a plurality of region identifiers and a corresponding determiner for each group. The image processing apparatus according to the fifth exemplary embodiment then performs region identification by using the plurality of region identifiers and the corresponding determiner generated for each group. The image processing apparatus according to the fifth exemplary embodiment will be described below. Here, differences of the image processing apparatus according to the fifth exemplary embodiment from the image processing apparatus according to the first exemplary embodiment will be described.

Figure 10:
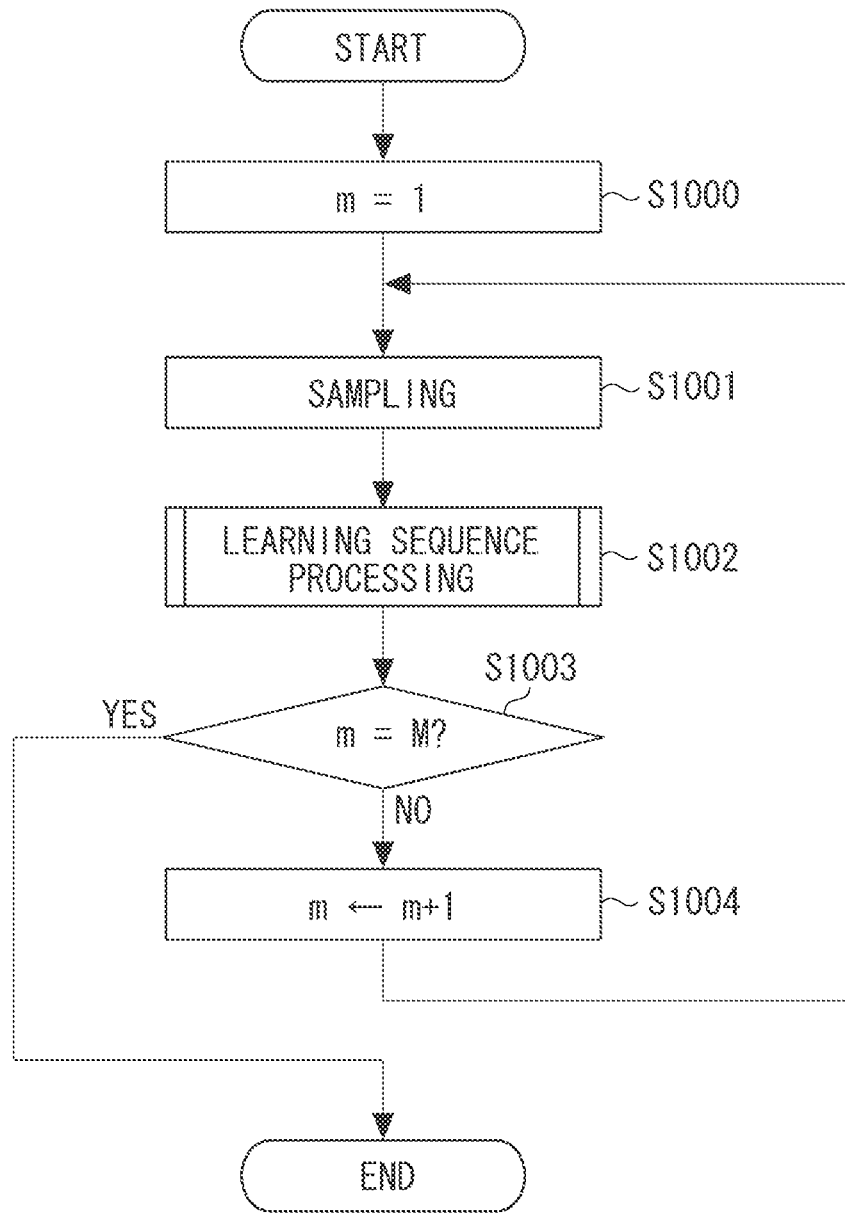
FIG. 10 is a flowchart illustrating learning processing according to a fifth exemplary embodiment.

FIG. 10 is a flowchart illustrating learning processing according to the fifth exemplary embodiment. In step S1000, the training data setting unit 120 initializes the value of a counter m to m=1. In step S1001, the training data setting unit 120 samples training data at random to provide variations of training data. The training data setting unit 120 selects $N_m$ pieces of training data at random from the N training images $I_n$ (n=1, . . . , N) stored in the training data storage unit 112. The set of selected images is handled as an initial training image set $U_0$ in an m-th learning sequence. $N_m$ may be set to any value within the range of $N_m \leq N$. For example, $N_m$ may be set to a half of N.

In step S1002, the image processing apparatus performs learning sequence processing. The learning sequence processing here refers to the processing of steps S500 to S510 described with reference to FIG. 5 according to the first exemplary embodiment. In other words, the image processing apparatus performs the learning processing described with reference to FIG. 5 by using the training data selected in step S1001. In step S1003, the training data setting unit 120 compares the value of the counter m with a predetermined value M. M is the number of times to perform the learning sequence processing. M is set in advance. If m=M (YES in step S1003), the learning processing ends. If m<M (NO in step S1003), the processing proceeds to step S1004. In step S1004, the training data setting unit 120 increments the value of the counter m. The processing then proceeds to step S1001.

In such a manner, the image processing apparatus according to the present exemplary embodiment can perform the learning sequence processing M times to obtain M determiners of different responses and a plurality of region identifiers corresponding to each determiner.

The image processing apparatus according to the present exemplary embodiment performs the learning sequence processing (step S1002) M times by repetition. In another example, the image processing apparatus may perform the learning sequence processing using different groups of training data in parallel. Moreover, while the image processing apparatus according to the present exemplary embodiment selects the training images at random, a learning condition may be changed instead to provide variations. For example, the training data setting unit 120 may change a control parameter relating to segmentation, or image features or region features to extract, by each learning sequence. The training data setting unit 120 may execute any of the learning sequences (learning processing) described in the first to fourth exemplary embodiments in each learning sequence. Such learning sequences may be combined to perform M learning sequences.

Figure 11:
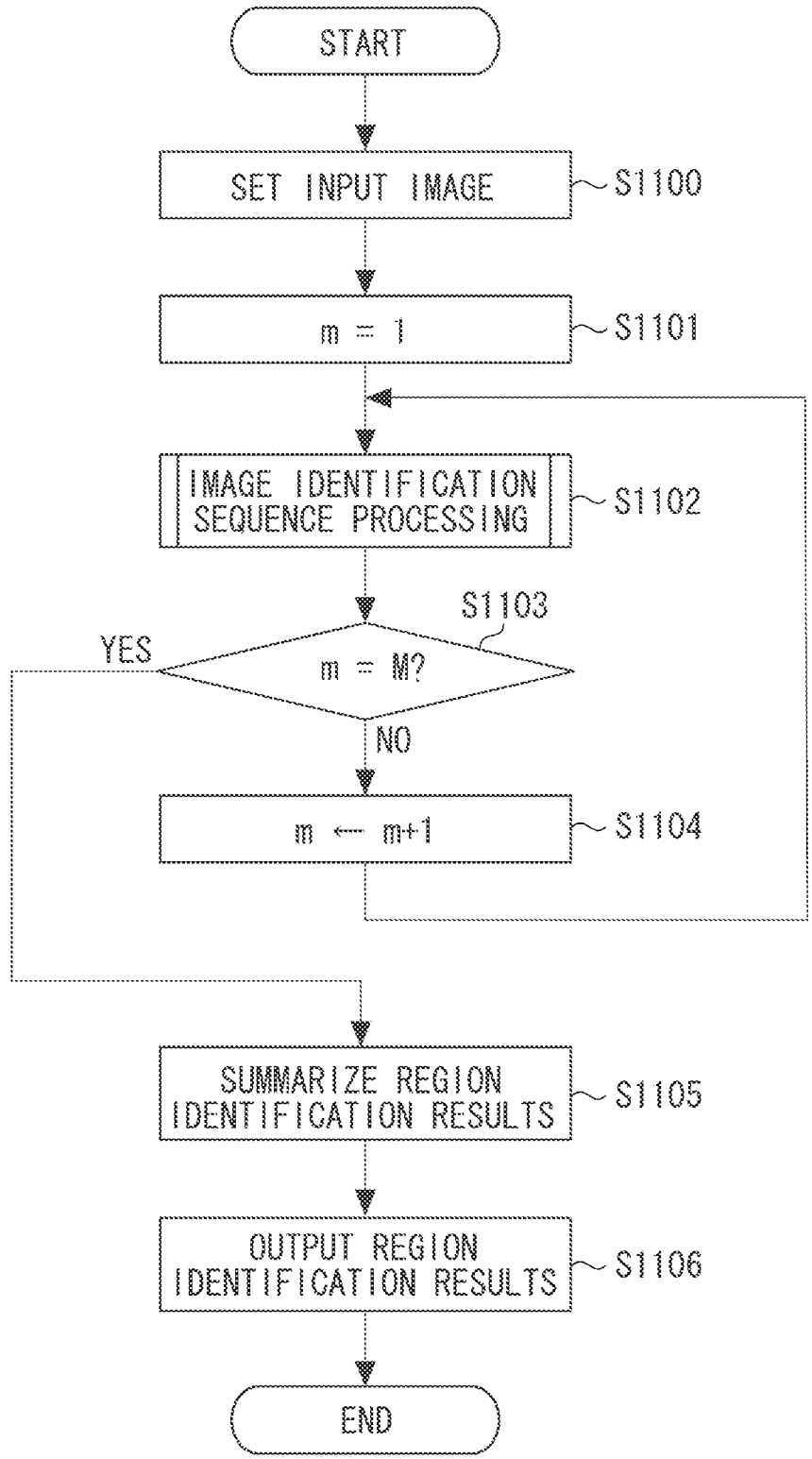
FIG. 11 is a flowchart illustrating image identification processing according to the fifth exemplary embodiment.

FIG. 11 is a flowchart illustrating image identification processing according to the fifth exemplary embodiment. In step S1100, the image setting unit 100 sets an input image to be processed. In step S1101, the image setting unit 100 initializes the value of the counter m to m=1. In step S1102, the image processing apparatus performs image identification sequence processing. The image identification sequence processing here refers to the processing of steps S201 to S205 described with reference to FIG. 2 according to the first exemplary embodiment. In other words, the image processing apparatus performs the processing of steps S201 to S205 described with reference to FIG. 2 on the input image set in step S1100.

In step S1003, the image setting unit 100 compares the counter m with a predetermined value M. If m=M (YES in step S1103), the processing proceeds to step S1105. If m<M (NO in step S1103), the processing proceeds to step S1104. In step S1104, the image setting unit 100 increments the value of the counter m. The processing then proceeds to step S1102. Thus, in the image identification processing according to the present exemplary embodiment, the image identification sequence processing is performed M times to obtain the region identification results of the region identifiers obtained by the respective learning sequences. In addition, the image processing apparatus uses different groups of a determiner and region identifiers in the respective rounds of the image identification sequence processing (step S1102). The image processing apparatus according to the present exemplary embodiment performs the image identification sequence processing (step S1102) M times by repetition. In another example, the image processing apparatus may perform the image identification sequence processing (step S1102) using different combinations of determiners and region identifiers in parallel.

In step S1105, the identification unit 105 performs voting on the region class of each pixel of the input image based on the M types of region identification results obtained by performing the image identification sequence processing M times. The identification unit 105 then selects the highest-voted region class as the final region class of the pixel. In step S1106, the output unit 106 outputs the region identification results. The rest of the configuration and processing of the image processing apparatus according to the fifth exemplary embodiment are similar to the configuration and processing of the image processing apparatuses according to the other exemplary embodiments.

As described above, the image processing apparatus according to the fifth exemplary embodiment can provide variations of training data to perform region identification in an ensemble manner.

Figure 12:
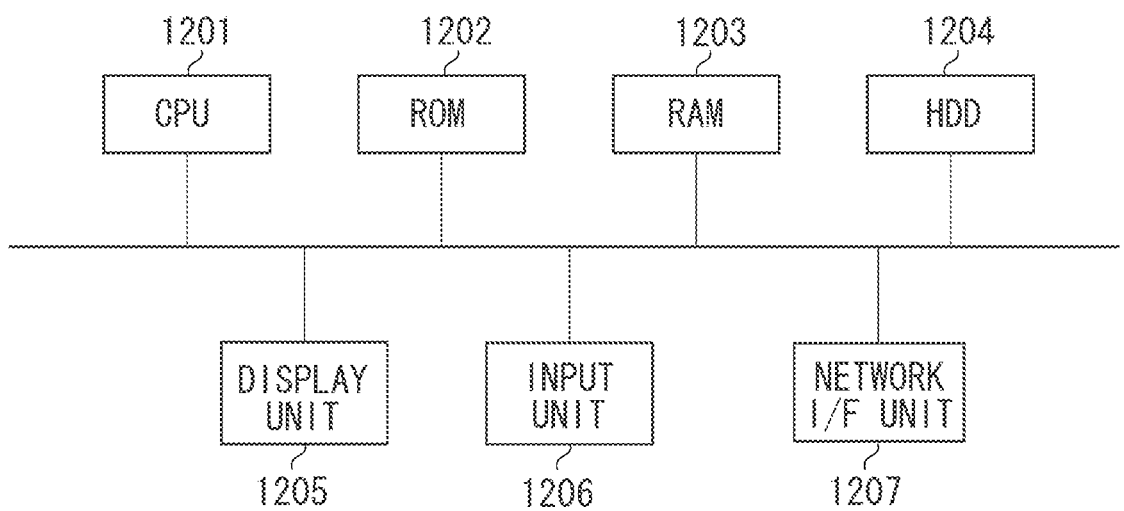
FIG. 12 is a block diagram illustrating a hardware configuration of the image processing apparatus.

FIG. 12 is a diagram illustrating a hardware configuration of the image processing apparatuses according to the first to fifth exemplary embodiments. A central processing unit (CPU) 1201 reads a control program stored in a read-only memory (ROM) 1202 and performs various types of processing. A random access memory (RAM) 1203 is used as a temporary storage area such as a main memory and a work area of the CPU 1201. A hard disk drive (HDD) 1204 stores various types of information such as image data and various programs. A display unit 1205 displays various types of information. An input unit 1206 includes a keyboard and a mouse, and accepts various operations made by the user. A network interface (I/F) unit 1207 performs communication processing with an external apparatus such as an image forming apparatus via a network. In another example, the network I/F unit 1207 may wirelessly communicate with an external apparatus. Functions and processing of the image processing apparatus are implemented by the CPU 1201 reading a program stored in the ROM 1202 or the HDD 1204 and executing the program.

In another example, the units of the image processing apparatus described with reference to FIG. 1 may be configured as respective independent devices. In another example, the units of the image processing apparatus may be implemented by a plurality of apparatuses. The units of the image processing apparatuses may be incorporated as a program or circuit inside an imaging apparatus such as a camera. The storage units of the image processing apparatus are implemented by an internal or external storage or storages of the image processing apparatus. The training data storage unit 112, the region identifier storage unit 111, and the determiner storage unit 110 may be constituted by the same storage or by three different storages.

The foregoing exemplary embodiments have been described by using image segmentation as an example. However, the application of the image processing apparatuses according to the present exemplary embodiments are not limited to segmentation. For example, the region identifiers may be replaced with pattern identifiers, and the superpixels may be replaced with block region-based partial images obtained by raster scanning of an image. In such a case, image pattern identifiers adaptable to variations of the imaging situation can be generated. Specific examples of the pattern identifiers may include a multiclass object detector and a face detector.

As described above, according to the foregoing exemplary embodiments, an image can be accurately identified even if image features vary due to a change in the imaging condition.

Several exemplary embodiments of the present disclosure have been described in detail above. The present disclosure is not limited to such specific exemplary embodiments, and various changes and modifications may be made without departing from the gist of the present disclosure set forth in the claims. Part of the foregoing exemplary embodiments may be combined as appropriate.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2014-184563, filed Sep. 10, 2014, which is hereby incorporated by reference herein in its entirety.

What is claimed is:

1. An image processing apparatus comprising:
a memory; and
a processor in communication with the memory, the processor configured to provide:
a segmentation unit configured to segment a learning image into a plurality of regions for learning;
a first learning unit configured to learn a first region identifier for identifying a class of a region in an input image based on first training data;
an evaluation unit configured to evaluate a result of identification of a class of the first training data by the first region identifier;
a generation unit configured to generate second training data by dividing the first training data into correct data and incorrect data based on an evaluation result by the evaluation unit, dividing the incorrect data into a plurality of categories, and combining the incorrect data divided into the plurality of categories with the correct data; and
a second learning unit configured to learn a plurality of second region identifiers different from the first region identifier based on the second training data,
whereby the image processing apparatus is configured to generate the first and second region identifiers so as to improve region identification accuracy and accurately identify images in a case where image features vary due to a change of an imaging condition.

2. The image processing apparatus according to claim 1, wherein the generation unit is configured to generate the second training data by dividing the first training data identified by the first region identifier learned by the first learning unit into correctly-identified data and incorrectly-identified data with respect to each class.

3. The image processing apparatus according to claim 2, wherein the generation unit is configured to generate the second training data in such a manner that, from among the first training data, data of which the evaluation result by the evaluation unit is greater than or equal to a predetermined threshold is determined as the correct data and data of which the evaluation result by the evaluation unit is smaller than the predetermined threshold is determined as the incorrect data.

4. The image processing apparatus according to claim 3, wherein the evaluation result by the evaluation unit is a ratio of correctly-identified pixels to all pixels of an image of the first training data.

5. The image processing apparatus according to claim 1, wherein the generation unit is configured to generate the second training data from the first training data in units of regions to identify the class, based on the evaluation result by the evaluation unit.

6. The image processing apparatus according to claim 1, wherein the generation unit is configured to generate the second training data from the first training data in units of images based on the evaluation result by the evaluation unit.

7. The image processing apparatus according to claim 1, wherein the processor is further configured to provide a determiner generation unit configured to generate a determiner for determining suitability degrees of the first region identifier learned by the first learning unit and the plurality of second region identifiers learned by the second learning unit based on the first training data and the second training data.

8. The image processing apparatus according to claim 7, wherein the processor is further configured to provide an identification unit configured to identify a class of an input image based on the suitability degrees output from the determiner according to an image feature of the input image and identification results of the first region identifier learned by the first learning unit and the plurality of second region identifiers learned by the second learning unit.

9. The image processing apparatus according to claim 8, wherein the identification unit is configured to assign weights to the identification results of the first region identifier learned by the first learning unit and the plurality of second region identifiers learned by the second learning unit according to the suitability degrees.

10. The image processing apparatus according to claim 7, wherein the processor is further configured to provide:
a selection unit configured to select an identifier to be used to identify a class of an input image from among the plurality of first region and second region identifiers learned by the first learning unit and the second learning unit based on the suitability degrees output from the determiner according to an image feature of the input image; and
an identification unit configured to identify the class of the input image by using the identifier selected by the selection unit.

11. The image processing apparatus according to claim 10, wherein the processor is further configured to provide a segmentation unit configured to segment the input image into a plurality of superpixels,
wherein the identification unit is configured to identify the class of the input image by using the identifier selected by the selection unit, based on an image feature of the superpixels segmented by the segmentation unit.

12. The image processing apparatus according to claim 11,
wherein the segmentation unit is configured to segment an image of the first training data into a plurality of superpixels, and
wherein the generation unit is configured to generate the second training data from the first training data in units of the superpixels.

13. The image processing apparatus according to claim 1, wherein the first learning unit is configured to learn a plurality of identifiers.

14. The image processing apparatus according to claim 13,
wherein the memory stores a plurality of combinations of the plurality of identifiers learned by the first learning unit and a determiner; and
wherein the processor is further configured to provide:
an identification unit configured to identify a class of an input image by any one of the combinations of the identifiers and the determiner stored in the storage unit.

15. An image processing method comprising:
segmenting a learning image into a plurality of regions for learning;
first learning a first region identifier for identifying a class of a region in an input image based on first training data;
evaluating a result of identification of a class of the first training data by the first region identifier;
generating second training data by dividing the first training data into correct data and incorrect data based on a result of the evaluating, dividing the incorrect data into a plurality of categories, and combining the incorrect data divided into the plurality of categories with the correct data; and
second learning a plurality of second region identifiers different from the first region identifier based on the second training data,
whereby the first and second region identifiers are generated so as to improve region identification accuracy and accurately identify images in a case where image features vary due to a change of an imaging condition.

16. A non-transitory computer-readable recording medium that stores a program for causing a computer to function as the units of an image processing apparatus comprising:
a segmentation unit configured to segment a learning image into a plurality of regions for learning;
a first learning unit configured to learn a first region identifier for identifying a class of a region in an input image based on first training data including at least one of the regions for learning;
an evaluation unit configured to evaluate a result of identification of a class of the first training data by the first region identifier;
a generation unit configured to generate second training data by dividing the first training data into correct data and incorrect data based on an evaluation result by the evaluation unit, dividing the incorrect data into a plurality of categories, and combining the incorrect data divided into the plurality of categories with the correct data; and
a second learning unit configured to learn a plurality of second region identifiers different from the first region identifier based on the second training data,
whereby the image processing apparatus is configured to generate the first and second region identifiers so as to improve region identification accuracy and accurately identify images in a case where image features vary due to a change of an imaging condition.

17. The image processing apparatus according to claim 1, wherein the processor is further configured to provide a third learning unit configured to learn a determiner for determining suitability degrees of the first region identifier learned by the first learning unit and the second region identifiers learned by the second learning unit based on the first training data and the second training data.

* * * * *